A. E. MARSHALL.
LOCKING DEVICE FOR AUTOMOBILE HOODS.
APPLICATION FILED JUNE 17, 1913.
1,097,455.
Patented May 19, 1914.
3 SHEETS—SHEET 1.
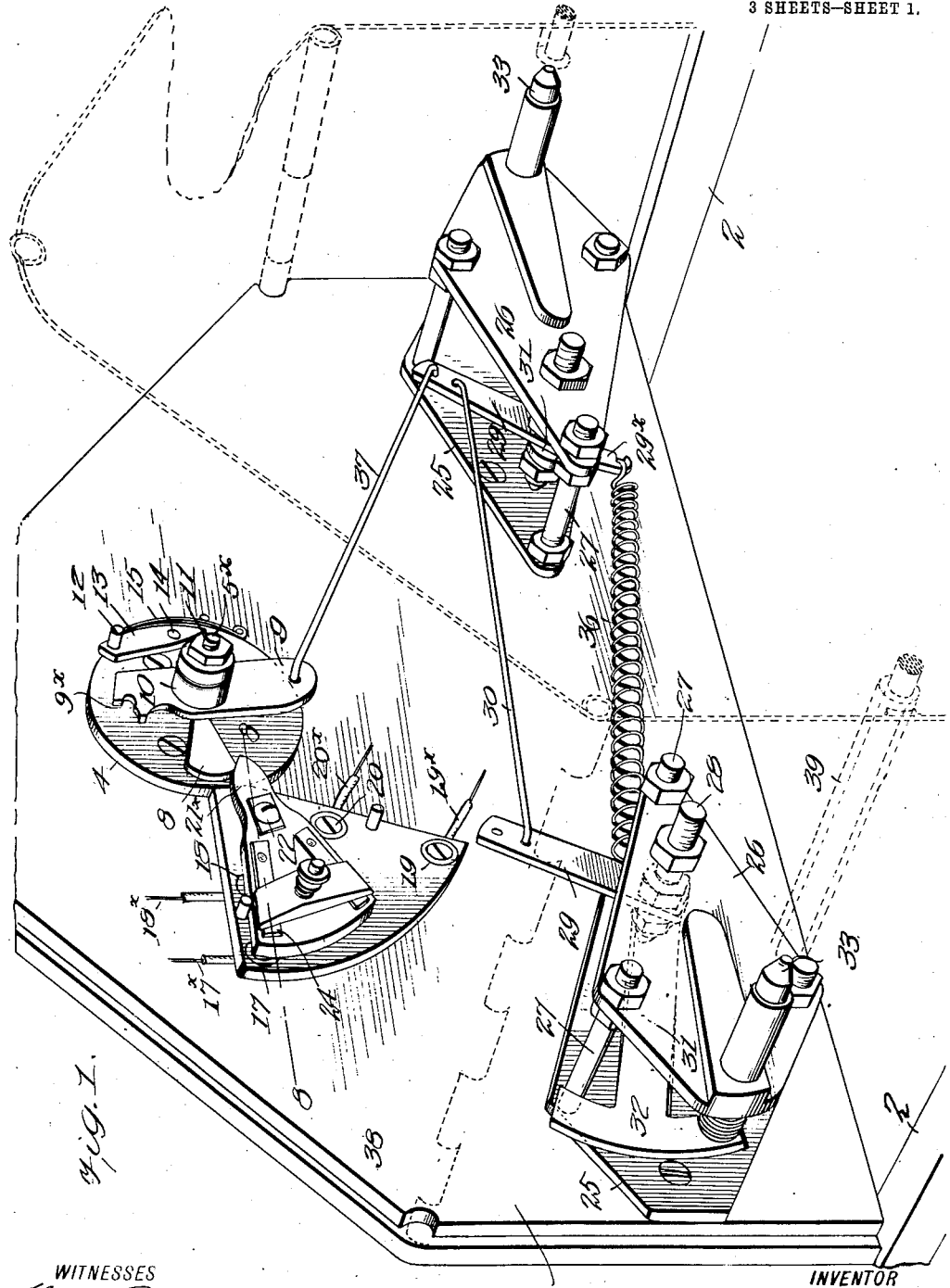

A. E. MARSHALL.
LOCKING DEVICE FOR AUTOMOBILE HOODS.
APPLICATION FILED JUNE 17, 1913.
1,097,455.
Patented May 19, 1914.
3 SHEETS—SHEET 2.
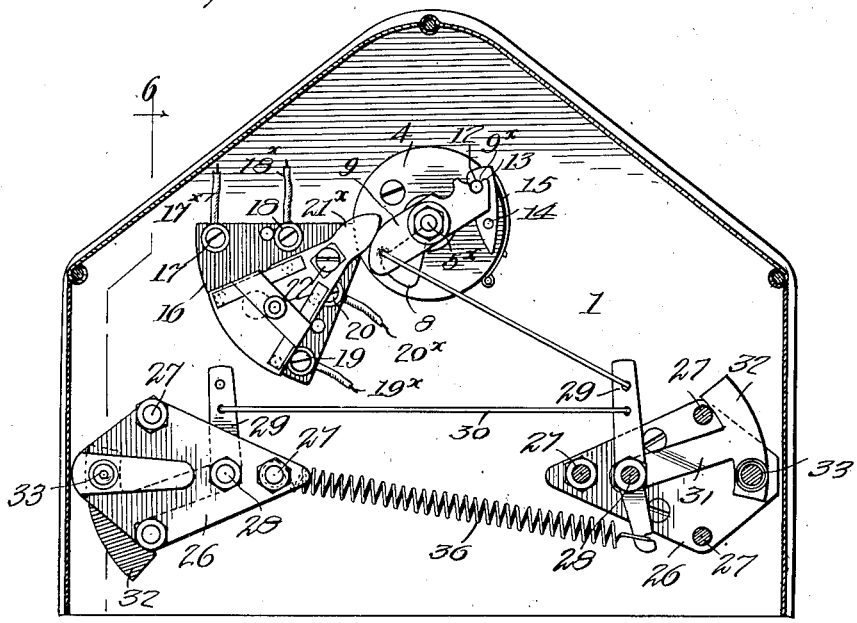
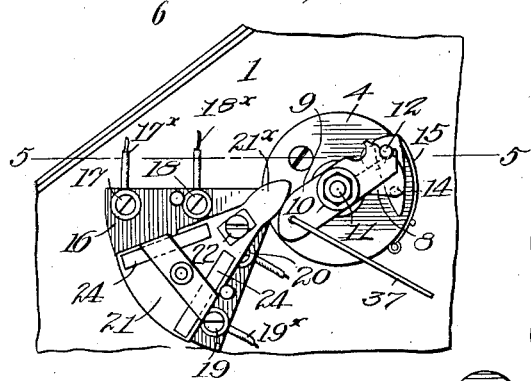
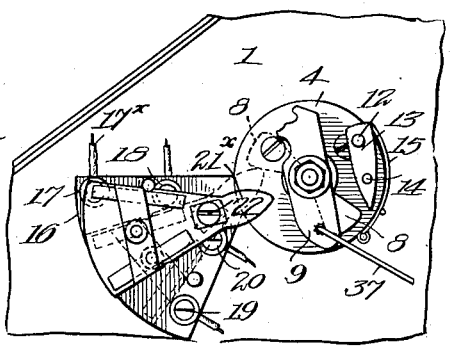
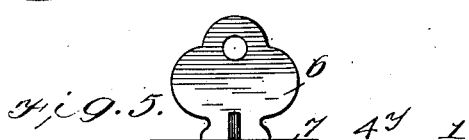
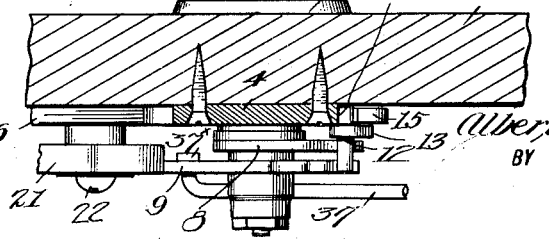
WITNESSES
F. C. Barry
L. A. Stanley
INVENTOR
Albert E. Marshall
BY Munn & Co.
ATTORNEYS A. E. MARSHALL.
LOCKING DEVICE FOR AUTOMOBILE HOODS.
APPLICATION FILED JUNE 17, 1913.
1,097,455.
Patented May 19, 1914.
3 SHEETS—SHEET 3.
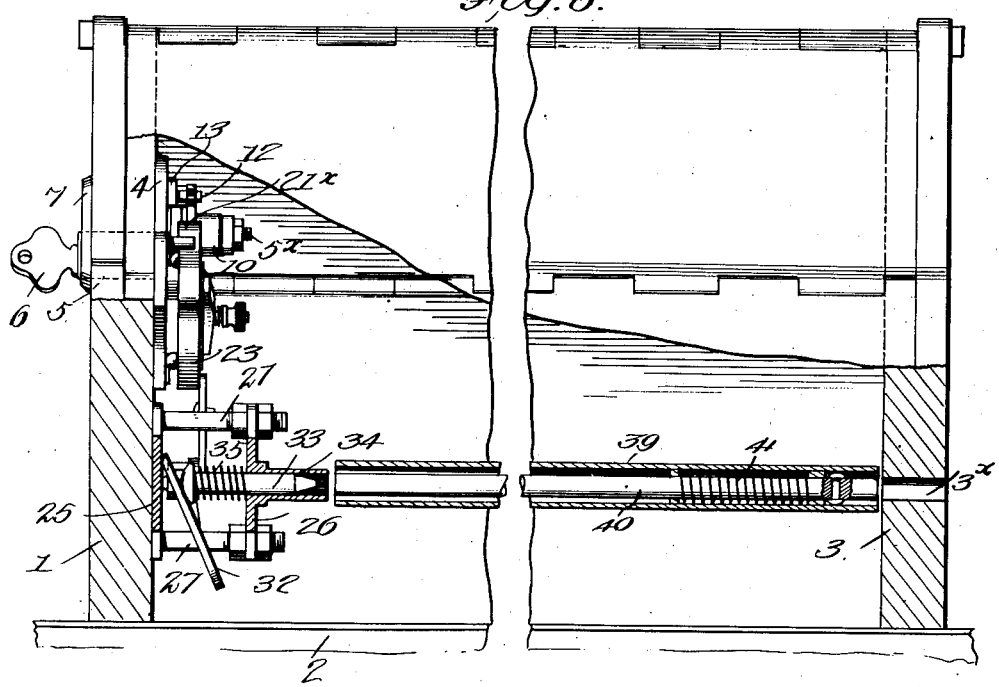
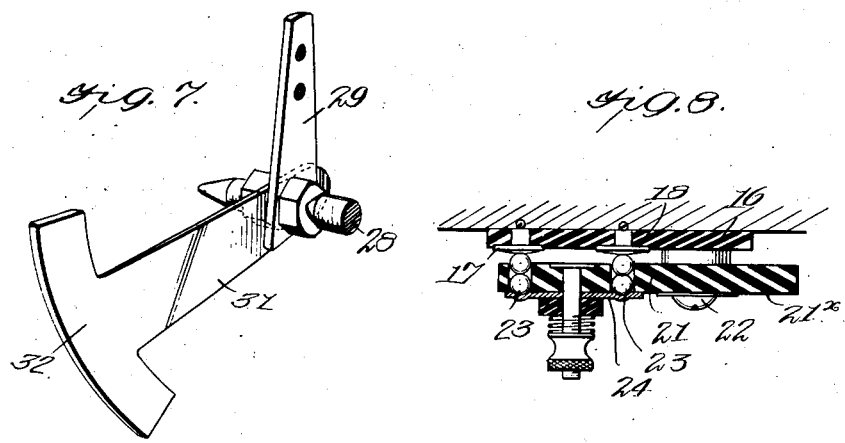
WITNESSES
F.E. Barry
L.A. Stanley
INVENTOR
Albert E. Marshall
BY Munn & Co.
ATTORNEYS

UNITED STATES PATENT OFFICE.

ALBERT E. MARSHALL, OF ASHEVILLE, NORTH CAROLINA.

LOCKING DEVICE FOR AUTOMOBILE-HOODS.

1,097,455. Specification of Letters Patent. Patented May 19, 1914.

Application filed June 17, 1913. Serial No. 774,138.

*To all whom it may concern:*

Be it known that I, ALBERT E. MARSHALL, a citizen of the United States, and a resident of Asheville, in the county of Buncombe and State of North Carolina, have made certain new and useful Improvements in Locking Devices for Automobile-Hoods, of which the following is a specification.

My invention relates to improvements in locking devices for automobile hoods, and it consists in the combinations, constructions, and arrangements herein described and claimed.

An object of my invention is to provide means for locking or unlocking an automobile hood so as to permit access to the engine or other parts contained therein, the locking mechanism serving also as a means for actuating a switch to cut out the sparking circuit.

A further object of my invention is to provide a locking device in which both sides of the hood as well as both ends may be simultaneously locked or unlocked.

A further object of my invention is to provide novel mechanism for accomplishing the locking and unlocking which is of comparatively simple nature and which is positive in action.

Other objects and advantages will appear in the following specification and the novel features of the device will be particularly pointed out in the appended claims.

My invention is illustrated in the accompanying drawings forming part of this application in which—

Figure 1 is a skeleton view showing the general arrangement of parts, Fig. 2 is a face view of the inner side of the end of the hood which forms part of the dash board of the vehicle, Fig. 3 is a face view of the switch in one position, Fig. 4 is a face view of the switch in another position, Fig. 5 is a section along the line 5—5 of Fig. 3, Fig. 6 is a section along the line 6—6 of Fig. 2, Fig. 7 is a perspective view showing one of the cam members, and Fig. 8 is a section along the line 8—8 of Fig. 1.

My invention may be applied to an automobile having any ordinary form of hood.

In the drawings 1 denotes the end of the hood which forms part of the dash board of the vehicle, 2 the side members of the frame of the vehicle, and 3 the radiator end of the hood.

Secured to the inner side of the dash board 1 is a locking plate 4 in which is mounted a rotatable barrel 5 arranged to receive a key 6 (see Fig. 6). A plate 7 on the outside of the dash forms part of the locking mechanism as in the ordinary lock. The barrel 5 bears an arm 8 which is rigidly connected with the barrel so as to turn with it. It also bears an arm 9 which is loosely mounted on a stem $5^x$ which forms a prolongation of the barrel 5. The arm 9 is held in place by means of the sleeves or washers 10 and the nut 11. The arm 9 is provided with a recess $9^x$ arranged to receive a pin 12 on an arm 13, which is pivotally mounted at 14 upon the plate 4, and which is provided with a spring 15 to normally press the pin 12 toward the center of the plate 4. As shown in Fig. 5 the plate 4 has recesses at $4^y$ to allow the pin 12 to enter.

The switch consists of an insulating base 16 provided with contacts 17 and 18 on one edge thereof and similar contacts 19 and 20 on the opposite edge. As will be seen from Fig. 8 the movable part of the switch consists of an insulating plate 21 pivoted at 22 to the base plate 16 and being provided with an extension $21^x$. The plate 21 is provided with sockets arranged to receive conducting balls 23, these balls being normally connected by strips such as those shown at 24. It will be apparent from Fig. 8 that when the switch is in the position shown in the figure the contacts 17 and 18 are connected through the balls 23 and the bridging contact 24. The opposite side of the switch is connected in precisely the same way so that when the switch is over the contacts 19 and 20 they are bridged.

A description of one of the locking members will be sufficient since they are both alike. These locking members consist of a base plate 25 which is attached to the member 1 and an outer plate 26, which is spaced from the base plate by means of the spacing posts such as those shown at 27. Carried between the plates 25 and 26 on a shaft 28 is a bell-crank lever whose short arm 29 is connected by means of a wire or rod 30 with the short arm on the opposite locking member. The long arm 31 is provided at its end with an arc-shaped cam member 32 which is inclined from the vertical as shown in Figs. 6 and 7. Each of these members 32 is designed to engage the head of a pin 33 disposed in a sleeve 34 and which is normally acted on by a spring 35 so as to press the head of the pin 33 against the cam member 32. It will be seen from Fig. 1, however, that a strong spring 36 is connected at one end to a prolongation 29ˣ of one of the short arms 29 of the bell-crank lever and at the other end to one of the stationary spacing members 27. The tendency of the spring 36 therefore is to pull both of the short arms of the bell-crank levers over toward the right of Fig. 1. The same short arm 29 of the bell-crank lever to which the wire or rod 30 is attached is also connected to the arm 9 by means of a rod or wire 37.

The hood 38 is provided on its inner sides with sleeves 39 having rods 40 which are normally held within the sleeve by means of the springs such as that shown at 41 in Fig. 6. When the hood is in its normal position these rods 40 are designed to register with openings 3ˣ in the radiator end of the hood.

From the foregoing description of the various parts of the device the operation thereof may be readily understood. The wires 17ˣ and 18ˣ (see Fig. 1) connect with the contacts 17 and 18. These wires lead to the magneto sparking circuit, while the wires 19ˣ and 20ˣ which connect with the terminals 19 and 20 lead to the battery circuit. When the machine is running the apparatus is in the position shown in Fig. 1. In this position it will be seen that the ends of the pins 33 have entered the ends of the sleeves 39, but in doing so they push on the rods 40, thereby causing their ends to enter the recesses or openings 3ˣ (see Fig. 6). The hood is thus locked at its four corners. The switch, it will be observed, is in a position to connect the terminals which lead from the coil of the magneto. Now when it is desired to unlock the hood the key is turned so as to swing the arm 8 from the position shown in Fig. 1 around to that position shown in full lines in Fig. 4. Here it engages the head 37ˣ of the rod 37 which passes through the arm 9 and further turning pulls the arm 9 together with the rod 37 against the tension of the spring 36. As the bell-crank levers move out of the way of the pins 33 the latter are retracted by their springs 35. The rods 40 are retracted by their springs 41 and thus the hood is unlocked at its four corners.

When the arm 8 is turned by the key as far as the position shown in Fig. 2 the pin 12 on the spring arm 13 passes into the recess 9ˣ of the arm 9, thereby holding the arm in position and keeping the hood unlocked. In the meantime the end of the arm 9 has engaged the projection 21ˣ of the switch and brought it back so as to connect the battery circuit. The hood will still be unlocked until the key is turned in the reverse direction so as to bring the arm into the position shown in Fig. 3. Here it strikes the pin 12 and forces it out of the socket 9ˣ, thereupon the spring 36ˣ pulls on the bell-crank levers and causes their inclined portions 32 to force the pins 33 outwardly thus locking the hood. In this connection it will be observed that one of the bell-crank levers moves upwardly while the other moves downwardly, but the principle in which they are operated is precisely the same. After the hood has been locked the arm 8 may be turned farther by the key into the dotted line position shown in Fig. 4 and the switch may then be turned so as to bring into circuit the magneto sparking device.

I claim:

1. The combination in an automobile having a dash board and a radiator head, of a hood for closing the space between the dash board and the radiator head, sleeves carried by the hood on the interior thereof, spring pressed rods disposed within said sleeves and arranged to engage the radiator head, and pins carried by the dash board and arranged to enter the ends of said sleeves for moving said spring pressed rods into engagement with the radiator head.

2. The combination in an automobile having a dash board and a radiator head, of a hood for closing the space between the dash board and the radiator head, sleeves carried by the hood on the interior thereof, spring pressed rods disposed within said sleeves and arranged to engage the radiator head, pins carried by the dash board and arranged to enter the ends of said sleeves for moving said spring pressed rods into engagement with the radiator head, and means including cam members arranged to engage said pins for operating the latter.

3. The combination in an automobile having a dash board and a radiator head, of a hood for closing the space between the dash board and the radiator head, sleeves carried by the hood on the interior thereof, spring pressed rods disposed within said sleeves and arranged to engage the radiator head, pins carried by the dash board and arranged to enter the ends of said sleeves for moving said spring pressed rods into engagement with the radiator head, cam members for forcing said springs within said sleeves, a rotatable barrel carried by said dash board, an arm rigidly carried by said barrel, a second arm loosely mounted on said barrel and arranged to be engaged by said first-mentioned arm, connections between said second-mentioned arm and one of said cam members for operating the latter, and connections between said cam members for operating the cam members simultaneously.

4. The combination in an automobile having a dash board and a radiator head, of a hood for closing the space between the dash board and the radiator head, sleeves carried by the hood on the interior thereof, spring pressed rods disposed within said sleeves and arranged to engage the radiator head, pins carried by the dash board and arranged to enter the ends of said sleeves for moving said spring pressed rods into engagement with the radiator head, cam members for forcing said springs within said sleeves, a rotatable barrel carried by said dash board, an arm rigidly carried by said barrel, a second arm loosely mounted on said barrel and arranged to be engaged by said first-mentioned arm, connections between said second-mentioned arm and one of said cam members for operating the latter, connections between said cam members for operating the cam members simultaneously, and a switch for controlling the sparking circuit arranged to be engaged by said rigid arm.

5. The combination in an automobile having a dash board and a radiator head, of a hood for closing the space between the dash board and the radiator head, sleeves carried by the hood on the interior thereof, spring pressed rods disposed within said sleeves and arranged to engage the radiator head, pins carried by the dash board and arranged to enter the ends of said sleeves for moving said spring pressed rods into engagement with the radiator head, cam members for forcing said springs within said sleeves, a rotatable barrel carried by said dash board, an arm rigidly carried by said barrel, a second arm loosely mounted on said barrel and arranged to be engaged by said first-mentioned arm, connections between said second-mentioned arm and one of said cam members for operating the latter, connections between said cam members for operating the cam members simultaneously, a spring secured to one of said cams, and means for locking said loosely mounted arm in its shifted position against the tension of said last-mentioned spring.

6. The combination in an automobile having a dash board and a radiator head, of a hood for closing the space between the dash board and the radiator head, sleeves carried by the hood on the interior thereof, spring pressed rods disposed within said sleeves and arranged to engage the radiator head, pins carried by the dash board and arranged to enter the ends of said sleeves for moving said spring pressed rods into engagement with the radiator head, cam members for forcing said springs within said sleeves, a rotatable barrel carried by said dash board, an arm rigidly carried by said barrel, a second arm loosely mounted on said barrel and arranged to be engaged by said first-mentioned arm, connections between said second-mentioned arm and one of said cam members for operating the latter, connections between said cam members for operating the cam members simultaneously, a spring secured to one of said cams, and means for locking said loosely mounted arm in its shifted position against the tension of said last-mentioned spring, the rotation of said rigid arm serving to unlock said loosely mounted arm thereby permitting said cams to return to their normal position.

ALBERT E. MARSHALL.

Witnesses:
 EDWIN L. RAY,
 JNO. A. CAMPBELL.